United States Patent
Jennings

(10) Patent No.: US 8,632,318 B2
(45) Date of Patent: Jan. 21, 2014

(54) PUMPING MUD BY ELECTROHYDRODYNAMIC PROPULSION

(75) Inventor: Charles E. Jennings, Tomball, TX (US)

(73) Assignee: Vetco Gray Inc., Houston, TX (US)

( * ) Notice: Subject to any disclaimer, the term of this patent is extended or adjusted under 35 U.S.C. 154(b) by 418 days.

(21) Appl. No.: 12/942,745

(22) Filed: Nov. 9, 2010

(65) Prior Publication Data

US 2011/0129358 A1 Jun. 2, 2011

Related U.S. Application Data

(63) Continuation-in-part of application No. 12/629,647, filed on Dec. 2, 2009.

(51) Int. Cl.
*H02K 44/00* (2006.01)

(52) U.S. Cl.
USPC .............................. 417/50; 166/105; 310/11

(58) Field of Classification Search
USPC .................. 417/50; 310/11; 166/105
See application file for complete search history.

(56) References Cited

U.S. PATENT DOCUMENTS

| | | | | |
|---|---|---|---|---|
| 2,331,696 | A | * | 10/1943 | Jones .............................. 507/102 |
| 4,808,079 | A | * | 2/1989 | Crowley et al. .................. 417/50 |
| 5,249,990 | A | * | 10/1993 | Laukien ............................ 440/6 |
| 5,333,444 | A | * | 8/1994 | Meng ................................ 60/221 |
| 5,685,698 | A | * | 11/1997 | Smoll ............................... 417/50 |
| 6,932,636 | B2 | | 8/2005 | Abbey et al. |
| 7,055,627 | B2 | * | 6/2006 | Fontana et al. .................. 175/65 |
| 2006/0073024 | A1 | | 4/2006 | Ghoshal et al. |
| 2007/0274840 | A1 | * | 11/2007 | Ehben et al. ..................... 417/50 |

FOREIGN PATENT DOCUMENTS

| | | |
|---|---|---|
| DE | 102004044539 A1 | 3/2006 |
| EP | 0453567 A1 | 10/1991 |
| WO | 9220139 A2 | 11/1992 |
| WO | 9949172 A1 | 9/1999 |

OTHER PUBLICATIONS

Machine translation of DE 10 2004 044 539.*
PCT Search Report and Written Opinion issued Jul. 27, 2011 in connection with corresponding PCT Application No. PCT/US2010/0055775.
PCT Search Report and Written Opinion issued Jul. 28, 2011 in connection with corresponding PCT Application No. PCT/US2011/032417.
Detail of grant entitled "basic technolog: Fluidic electricity generation by electrohydrodynamical flow of colloidal particles", http://gow.epsrc.ac.uk/ViewGrant.aspx?GrantedRef=GR/S67845/01 (Jan. 27, 2011).

* cited by examiner

*Primary Examiner* — Charles Freay
*Assistant Examiner* — Christopher Bobish
(74) *Attorney, Agent, or Firm* — Bracewell & Giuliani LLP

(57) ABSTRACT

A section of riser casing urges drilling mud through the riser, either upward from the sea floor to reduce head pressure or downward toward the wellbore. The section of riser casing may use an electromagnet, two or more electrodes, or a combination of electromagnets and electrodes to urge drilling mud having electrohydrodynamic properties through the riser casing.

20 Claims, 7 Drawing Sheets

PUMPING MUD BY ELECTROHYDRODYNAMIC PROPULSION

This application is a continuation-in-part application of co-pending U.S. patent application Ser. No. 12/629,647, filed Dec. 2, 2009, the full disclosure of which is hereby incorporated by reference herein

BACKGROUND OF THE INVENTION

1. Field of the Invention

The present invention relates in general to a method and apparatus to pump material through a tubular using electrohydrodynamics and in particular to pumping drilling mud through a tubular using electrohydrodynamics.

2. Brief Description of Related Art

In earth-boring operations such as drilling wells for mineral recovery, drilling mud is pumped through a drill string and out into the wellbore from a point near the drill bit. The drilling mud lubricates the cutting surfaces of the drill bit and also moves the spoil from the drill bit up through the wellbore toward the surface. Pieces of rock and other abrasive materials are suspended in the drilling mud as the drilling mud rises to the surface.

For offshore wells, moving materials such as drilling mud, and cuttings suspended in drilling mud, up from the depths of the earth during drilling requires moving the materials up through two gradients. The first gradient being the distance from the drill bit to the sea floor and the second gradient being from the sea floor up through a riser pipe or casing the drilling rig. Drilling operations in deep water is sometimes referred to as "dual gradient drilling."

In dual gradient drilling operations, static head pressure builds as the drilling mud is pumped to the surface. Significant pressure is required to move the drilling mud up through the wellbore against the head. The head pressure is further increased in deep water drilling operations because the drilling mud must also overcome the static head pressure in the riser as the mud moves from the mudline wellhead housing up to the rig on the surface of the water. The high injection pressure required to overcome the head pressure may result in damage to the riser or damage to the rock formation. Dual gradient drilling operations may use a separate mud return line for moving drilling mud upward through the sea to the drilling rig and thus reduce head pressure on the riser.

Head pressure in the rock formation can be reduced if the drilling mud is pumped up from the sea floor to the drilling rig, either through the riser or through a bypass. Various conventional pumping technologies have been tested to pump the drilling mud up through the riser or to pump the drilling mud through an external bypass tube that runs parallel to the riser. Unfortunately, the rock and abrasives in the drilling mud are very destructive to seals and moving parts associated with conventional pumps, resulting in frequent pump failures. A method of pumping drilling mud through a riser, that does not require a conventional pump is desired.

SUMMARY OF THE INVENTION

A section of riser may have one or more electromagnets, one or more electrodes, or a combination thereof, that may be used to pump drilling mud up through the riser column from a sea floor wellhead housing toward the surface of the sea. In an exemplary embodiment, a section of riser is configured with an electrically insulated liner and circular copper coils wrapped around an iron sleeve, which when energized with electric current form a magnetic field around a column of fluid such as drilling mud. The section of riser also has horizontally opposed electrodes for providing an electric charge to the fluid, such as drilling mud, at the location of the magnetic field. The fluid, when charged with electricity and subjected to the magnetic field, may perform as an armature and thus the assembly may function as a continuous linear motor pushing the column of fluid up through the riser.

The fluid, such as drilling mud, may be propelled by the magnetic field and electric charge due to electrohydrodynamic properties in the fluid. Drilling mud may be made from bentonite. Bentonite clay chemistry has an electrical imbalance in the gibbsite layer, which causes the flake to be like a magnet with a strong positive (+) charge in its center and a negative (−) charge on the flake surface.

Pulsing electricity may cause the copper coil, wrapped around an iron sleeve, to generate magnetic fields which may exert force against the drilling mud (electrohydrodynamic fluid) and thus propel the drilling mud through the riser. The propulsion of the drilling mud may relieve at least some of the downhole pressure on the rock formation.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
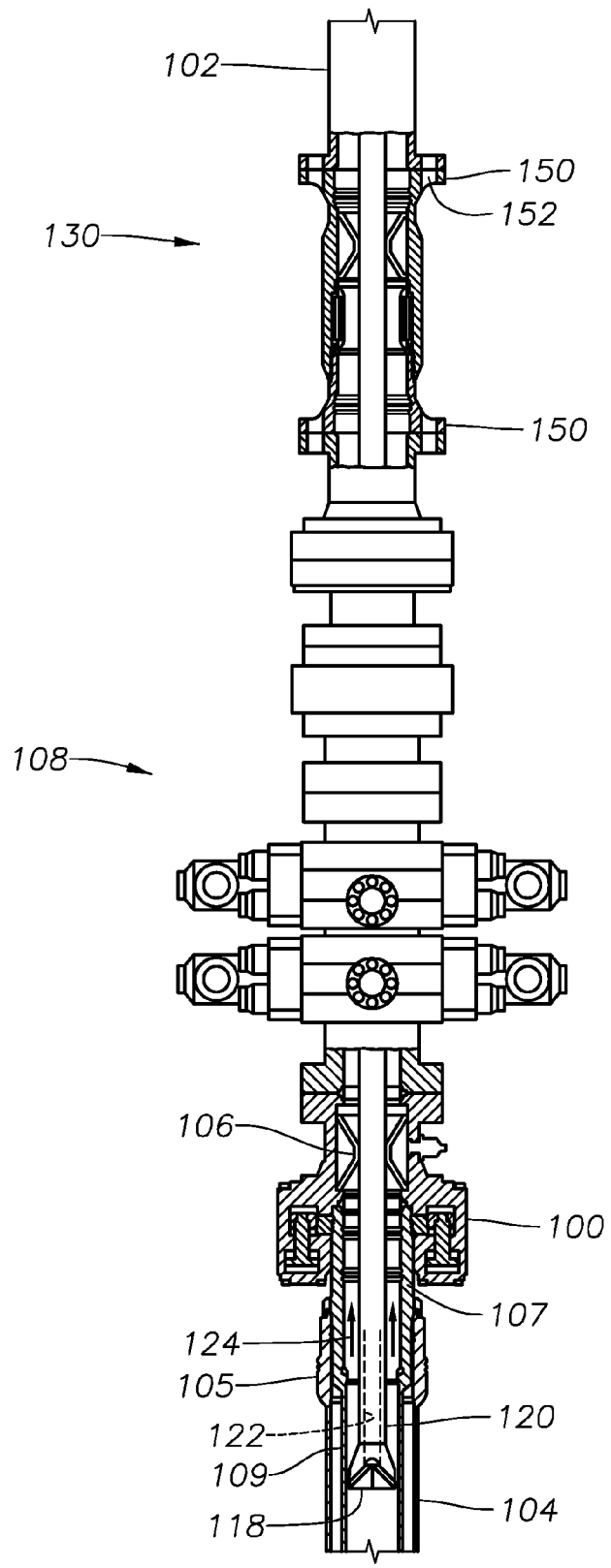
FIG. 1 is a partial sectional view of an exemplary embodiment of a pumping apparatus having a magneto drive.

Referring to FIG. 1, riser connector 100 forms a lower end of a riser 102. Riser 102 rises from the sea floor up, through the sea, to a termination point (not shown). The termination point (not shown) is typically on a surface drilling rig (not shown), but may be in other locations. Wellbore conductor pipe 104 is attached to, and in communication with, an outer wellhead housing 105. Wellbore conductor pipe 104 extends into the earth below outer wellhead housing 105. An inner wellhead housing 107 is at the upper end of wellbore casing 109. Riser connector 100 secures to the upper end of inner wellhead housing 107. One or more opening centralizers 106 may be located within the bore of riser 102 at riser connector 100. One or more blowout preventers 108 may be incorporated in riser 102, and in this example they are at the lower end.

Drill bit 118, located on an end of drill string 120, passes through riser 102, inner wellhead housing 107, and wellbore casing 109 to drill the wellbore further into the depths of the earth. The rotation of drill bit 118 cuts rock from the earth. Drill string 120 is a conduit having drill string bore 122, which forms a passage that runs the length of drill string 120. Drilling mud 124 is pumped from the surface rig (not shown), through drill string bore 122, to drill bit 118. Drilling mud 124 exits drill string bore 122 at drill bit 118 and serves to cool and lubricate the cutting surfaces of drill bit 118. Drilling mud is injected through drill string bore 122 under pressure. As additional drilling mud 124 is pumped through drill string bore 122, drilling mud 124 rises up through wellbore casing 109 and then through riser 102, traveling on the exterior of the drill string as it moves toward the surface. As drilling mud 124 rises through the wellbore and riser 102, it carries cuttings and other solids, such as rock and spoil, toward the surface through wellbore casing 109 and riser 102.

Drilling mud 124 may be a colloidal suspension having electrohydrodynamic properties, thus making it an electrohydrodynamic ("EHD") fluid. Due to its electrohydrodynamic properties, drilling mud 124 may be propelled by magnetic fields or electrical current. In an exemplary embodiment, drilling mud 124 is a bentonite based slurry comprising bentonite and water. Bentonite may have expansive characteristics of from 10 to 20 times its original volume. In an exemplary embodiment, the bentonite used in the drilling mud 124 comprises about 29.8% silicon, 10.6% aluminum, 2.6% iron, 1.45% magnesium, 0.69% calcium, 1.80% sodium, 0.42% potassium, 1.19% hydrogen, 51.5% oxygen, and a mineralogic composition of 92.0% sodium montmorillonite, 4.0% quartz, 3.0% feldspar (albite), and 1.0% biotite. In another embodiment, the Bentonite used in drilling mud 124 can comprise about 62% $SiO_2$, $Al_2O_3$, 2.5% $Na_2O$, 3.5% $Fe_2O_3$, 0.45% FeO, 1.8% MgO, 5.5% $H_2O$ (crystalline), $TiO_2$, $SO_2$, CaO, $Na_2O$, and $K_2O$. Other formulations of drilling mud 124 can be used.

In one embodiment, the pH of the electrohydrodynamic fluid (drilling mud 124) can be between 10 and 11. Sodium hydroxide (NaOH) can be used to increase the pH level in the bentonite. The sodium hydroxide can cause the negative ions to become more positive and, thus, not stick to a positive electrode. The bentonite clay chemistry may have electrohydrodynamic properties, wherein an electrical imbalance in the gibbsite layer causes the solid matter (flake) to be like a magnet with a strong positive (+) charge in its center, and a negative (−) charge on the flake surface. Other colloidal suspensions having electrohydrodynamic properties may be used for drilling mud 124. Barite and other heavy metals may also be present in drilling mud 124. Thus drilling mud 124 may be a colloidal fluid used as the electrohydrodynamic active component.

Figure 2:
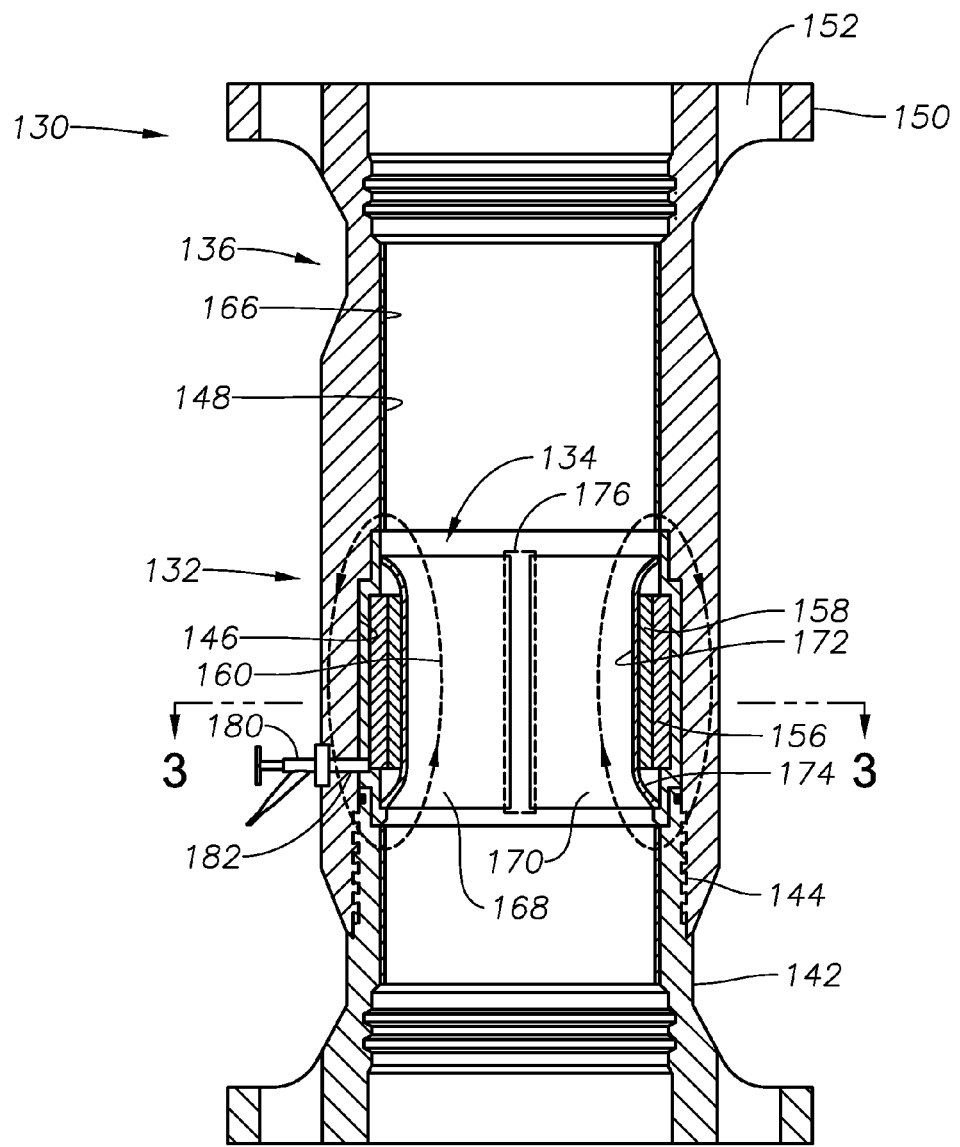
FIG. 2 is a detailed sectional view of an embodiment of the magneto drive of the pumping apparatus of FIG. 1.

Referring to FIG. 2, magneto drive 130 is a section of riser casing that may use electromagnet 132 and electrode 134 to generate a magnetic field and an electric charge. Due to the EHD properties of drilling mud 124, the magnetic field and electric charge may propel drilling mud 124 in a particular direction. Due to its heavy metal content, the barite within drilling mud 124 may also be propelled by magnetic fields or electric currents and thus contribute to the propulsion of drilling mud 124.

Magneto drive 130 may be a tubular segment that forms a portion of riser 102 and may be located anywhere along riser 102, including, for example, just above riser connector 100. Multiple magneto drives 130 may be used along riser 102. Magneto drive 130 may be any length. In an exemplary embodiment, magneto drive 130 may be 10 ft. long. Assuming a standard section of riser 102 is 70 ft. long, a magneto drive 130 may be located, for example every 70 ft. or every 140 ft. along riser casing as riser casing rises from wellhead housing 107 (FIG. 1) up to the surface of the sea (not shown). In some embodiments, two or more magneto drives 130 may be joined together to form a tandem pump between two sections of pipe of riser 102. In some embodiments, one or more magneto drives, such as magneto drive 130, may be located inside the wellbore to pump fluids up through the wellbore. Magneto drives such as magneto drive 130 may be used in addition to or in lieu of conventional pumping techniques.

Referring to FIG. 2, in an exemplary embodiment, magneto drive 130 includes drive casing 136, which may be a tubular member, such as a metal pipe, having an outer diameter and an inner bore. Drive casing 136 may include a flange end 142. Threads 144 may be used to join and seal flange end 142 to drive casing 136. Flange end 142 may be removed to allow installation of components such as electrode 134, and electromagnet 132 into drive casing 136. Some portions of drive casing 136 may have recess 146. Recess 146 is an annular groove in the inner diameter of drive casing 136, wherein the inner diameter of recess 146 is greater than inner diameter 148 of other portions of drive casing 136. All or a portion of electromagnet 132 may fit within recess 146. In some embodiments, the ID of recess 146 is large enough that the ID of electromagnet 132 may sit flush with ID 148 of drive casing 136.

After components are installed into drive casing 136, flange end 142 may be threadingly engaged to drive casing 136. Other techniques and devices may be used to facilitate installation of components into drive casing 136. Magneto drive 130 may be connected to other riser 102 elements by any variety of methods. In some embodiments, joint members, such as flanges 150 with apertures 152, may be used to attach with bolts magneto drive 130 to adjoining riser 102 elements. Flange end 142 also has apertures for bolting to other riser 102 elements.

Electromagnet 132 can include coils 156, which may encircle the bore of drive casing 136. In some embodiments, coils 156 may be wrapped around sleeve 158. Coils 156 has turns that may be perpendicular to the axis of the bore of drive casing 136. Coils 156 are wire or other thin, conductive material wrapped repeatedly in a generally annular configuration. Coils 156 may be copper wire, but may be made of other conductive materials. The copper wire of coils 156 may be coated with an insulative coating, such as varnish, to prevent each turn of coil 156 from shorting out against an adjacent turn of coil 156.

Sleeve 158 may be made of iron, steel, or any other kind of ferrous material suitable for electromagnetically supporting coils 156. Electric power is applied to electromagnet 132 to create magnetic field 160. One of ordinary skill in the art will appreciate the nature of an electromagnet for creating a magnetic field 160 in a central bore.

In some embodiments (not shown), coils 156 may be wrapped around an outer diameter surface of drive casing 136. In these embodiments, drive casing 136 may function as a sleeve, or a separate sleeve 158 may be used in addition to any support provided by drive casing 136.

Direct current ("DC") electric current may be applied to coil 156 to generate magnetic field 160. At least a portion of magnetic field 160 is located within the bore of drive casing 136. Magnetic field 160 may have a particular vector. The polarity of the electricity applied to electromagnet 132 can shape the vector and cause the magnetic field vector to move up through the central bore of magneto drive 130. Magnetic field 160 may propel drilling mud 124, having EHD properties, through magneto drive 130. As will be described in more detail, below, coil 156 can generate a magnetic field 160 to propel mud 124 up through magneto drive 130, or the electrical polarity can be applied in the opposite direction to generate a magnetic field that propels drilling mud 124 down through magneto drive 130. The electric current applied to coil 156 may be a constant DC current to create a constant magnetic field, or may be a pulsing DC electric current to create a pulsating magnetic field.

A liner 166 may cover all or part of an inner diameter surface of magneto drive 130. Liner 166 may be made of a non-conductive material such as, for example, rubber or ceramic. Other insulative or semi-conducting materials may be used for liner 166. Liner 166 may provide insulation to prevent electrical current present within drilling mud 124 from discharging against inner diameter 148 of magneto drive 130.

Figure 3:
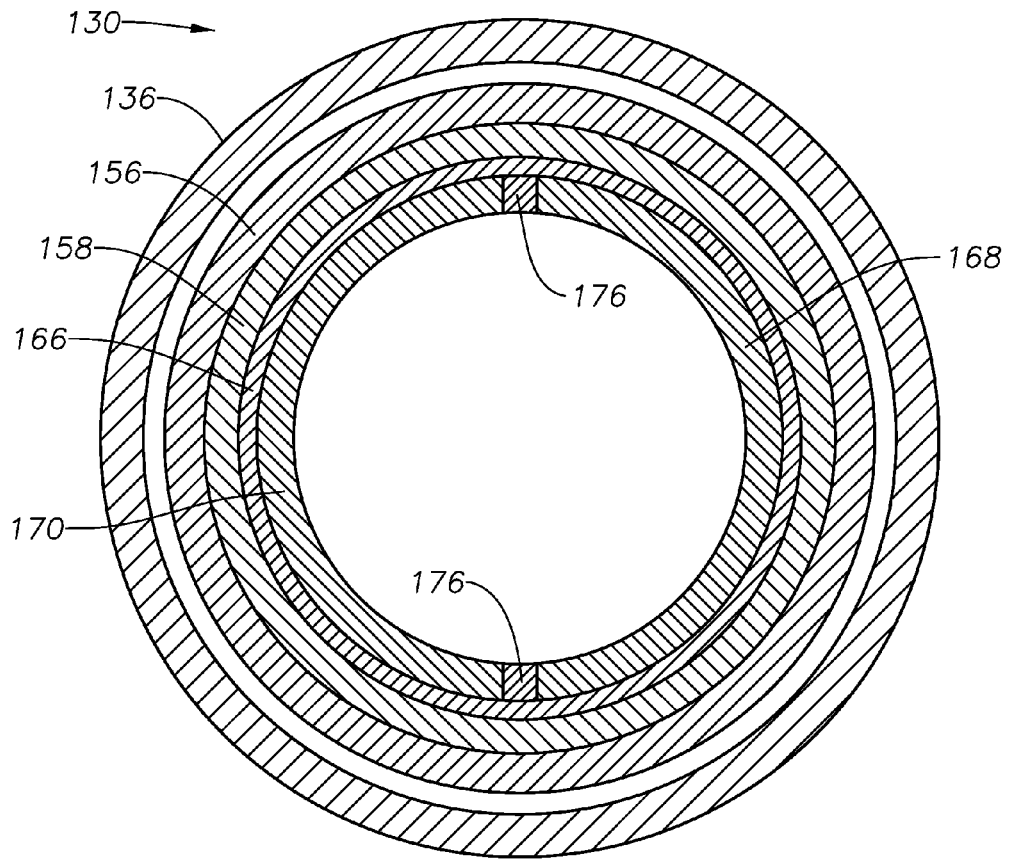
FIG. 3 is a cross sectional view of an exemplary embodiment of an electrode of the magneto drive of FIG. 2, taken along the 3-3 line.

Electrode 134 may include an opposing anode 168 and cathode 170. As shown in FIGS. 2 and 3, anode 168 and cathode 170 (collectively "electrodes") are opposing, semi-cylindrical plates that line a portion of magneto drive 130. In some embodiments, inner diameters 172 of electrodes 168 and 170 protrude inward from inner diameter 148 of magneto drive 130. A rounded portion 174 of electrodes 168, 170 may transition from inner diameter 148 to the inner diameter 172 of electrodes 168, 170 at the top and bottom. Insulated spacer strips 176 may be located between opposing edges of anode 168 and cathode 170. Anode 168 and cathode 170 each extend less than 180 degrees, resulting in two vertical gaps 180 degrees apart, each filled with a spacer strip 176. Insulated spacer strip 176 is not used in some embodiments. Electrodes may have any shape, and may include fins (not shown). Anode 168 and cathode 170 can be electrically insulated from the components of electromagnet 132.

A positive current may be applied to anode 168 and a negative current or ground may be applied to cathode 170. A conductive medium, such as drilling mud 124, may be located between, and in contact with, anode 168 and cathode 170. Electric current thus passes through drilling mud 124 and charges at least the portion of drilling mud 124 that is located between anode 168 and cathode 170.

Power connector 180 may be located on magneto drive 130 for providing power to electromagnet 132 and electrode 134. Power connector 180 may be of the type such as the one described in U.S. Pat. No. 6,932,636 to Abbey, titled Electrical Penetrator Connector, which is incorporated herein by reference. In some embodiments, power connector 180 may have four or more conductors (not shown), such as a positive and negative connection for each of electromagnet 132 and electrode 134. In other embodiments, a separate power connector 180 may be used for each of the required electrical connections.

A positive conductor and a negative conductor are connected from power connector 180 to the ends of coil 156 of electromagnet 132. Similarly, a positive connection may provide power to anode 168 while a negative connection may provide power to cathode 170 of electrode 134. The conductors (not shown) of power connector 180 may pass through drive casing 136 and one or more conductors may pass through liner 166. In addition to the insulation of each wire, insulator 182 may be used to prevent conductors (not shown) from contacting drive casing 136. In an exemplary embodiment, connector 180 is suitable for use with a remotely operated vehicle ("ROV") wherein the ROV is able to attach power cables to connector 180 when magneto drive 130 is submerged in sea water. The power supply (not shown) for providing electrical current may be located above the surface of the sea, such as on a drilling rig (not shown). Cables (not shown) may run from the power supply (not shown) to power connector 180.

The voltage applied through power connector 180 may be any voltage. In some embodiments, the DC voltage may be 400-600 volts and 400-600 amps. The voltage applied to electromagnet 132 may be the same as or different than the voltage applied to electrode 134. The voltage and amperage could be substantially higher or substantially lower than the ranges of the exemplary embodiment.

The electrical imbalance in the gibbsite layer of the bentonite clay used for drilling mud, along with any barite or other heavy metals suspended in drilling mud 124, cause drilling mud 124 to behave like a magnet or ferrous material when exposed to magnetic fields or voltage. Thus magneto drives such as magneto drive 130 behave as a linear motor wherein drilling mud 124 acts as the armature. Indeed, the drilling mud 124 is a fluid that performs as the armature and becomes a continuous linear motor that pushes the column of drilling mud 124 through riser 102. The polarity of the electric current and magnetic field can be applied in one direction to urge drilling mud 124 up through riser 102, and thus lessen the hydrostatic head on the downhole formation. The polarity of the electric current and magnetic field can be applied in a second direction to urge drilling mud 124 downward toward the downhole formation.

In embodiments using both electromagnets 132 and electrodes 134, the sodium bentonite and barite slurry, or drilling mud 124, may be forced to move up through magneto drive 130 by the large current projected transversely through the slurry. The electric current may react with the magnetic field at right angles to drive casing 136 and the current flow.

Figure 7:
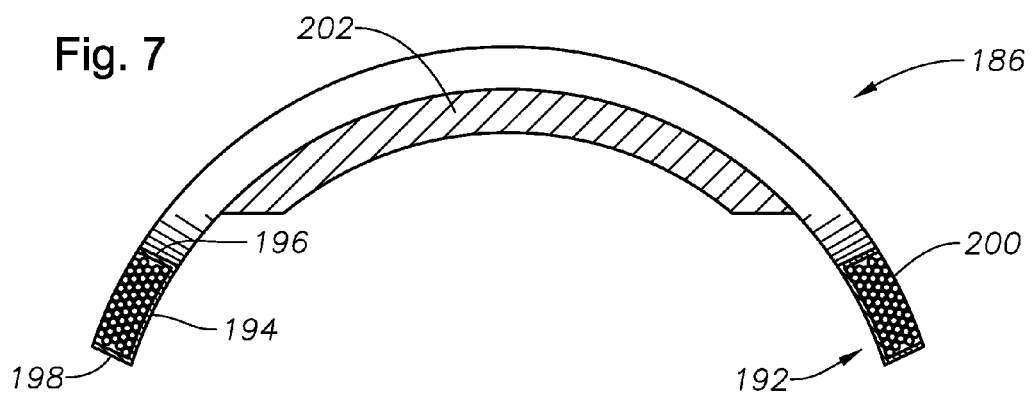
FIG. 7 is a sectional view of the coil of FIG. 6, taken along the 7-7 line.
Figure 4:
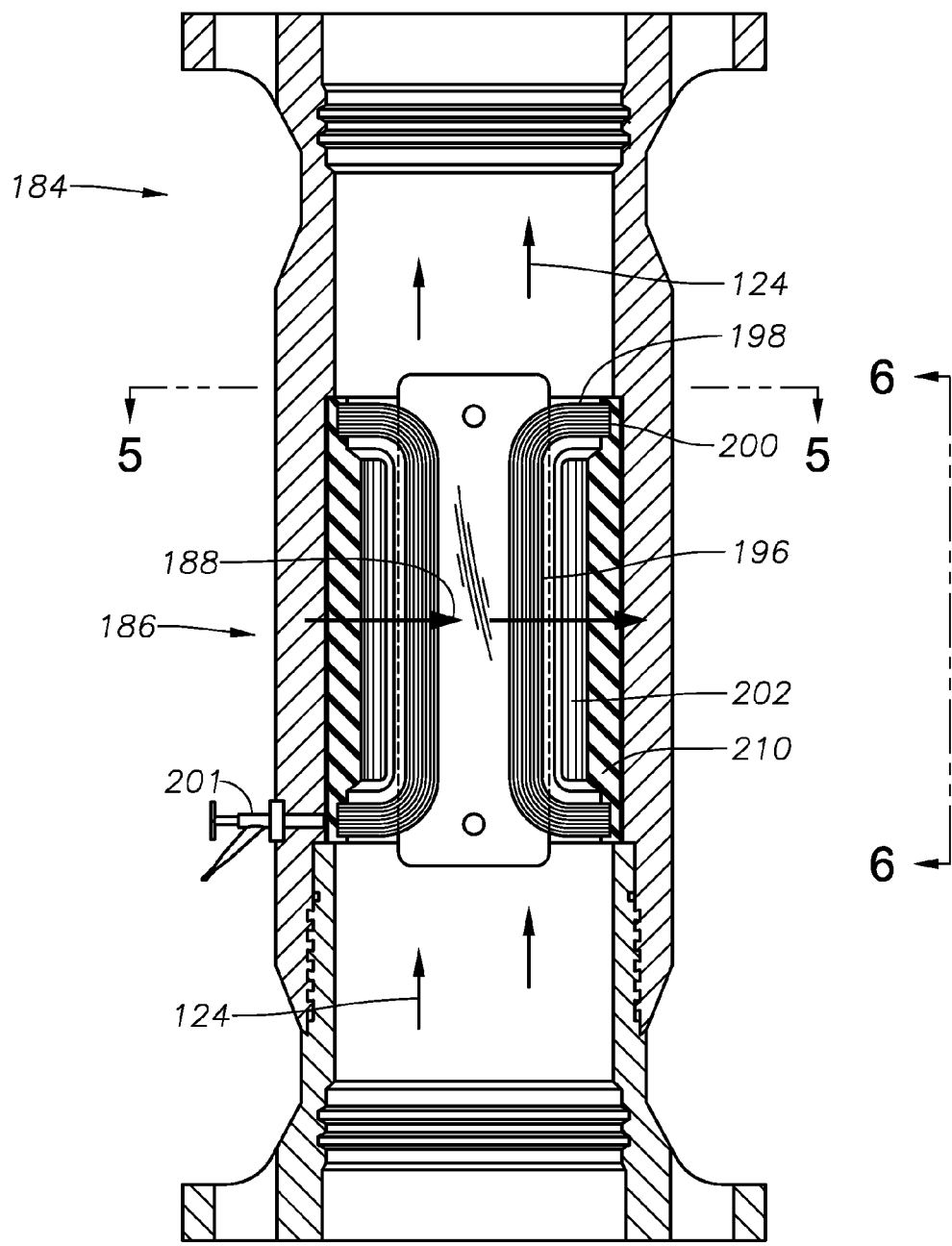
FIG. 4 is a partial sectional view of an alternative embodiment of a pumping apparatus having a magneto drive.
Figure 5:
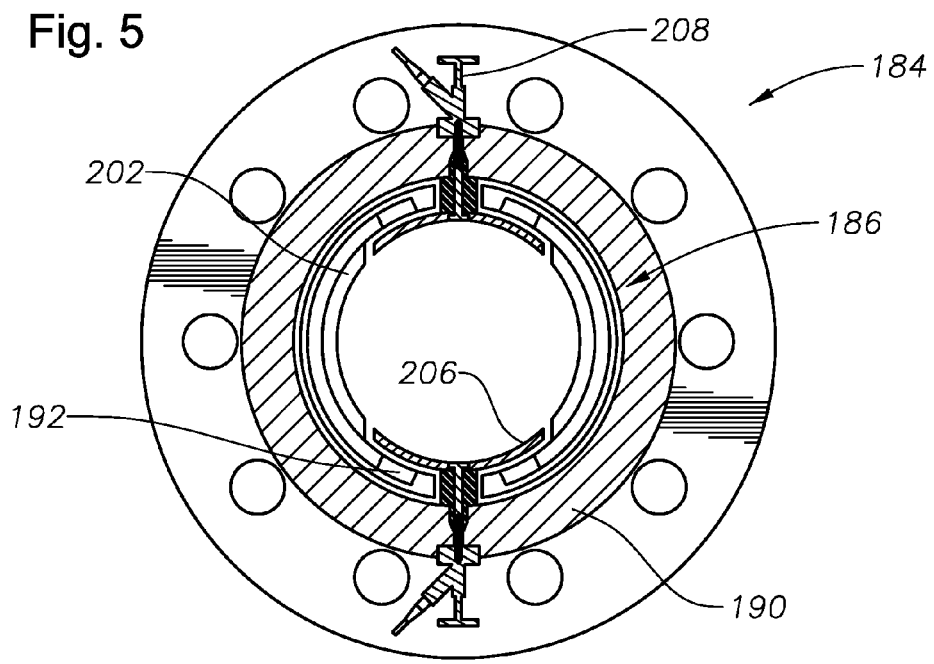
FIG. 5 is a sectional view of the magneto drive of FIG. 4, taken along the 5-5 line.
Figure 6:
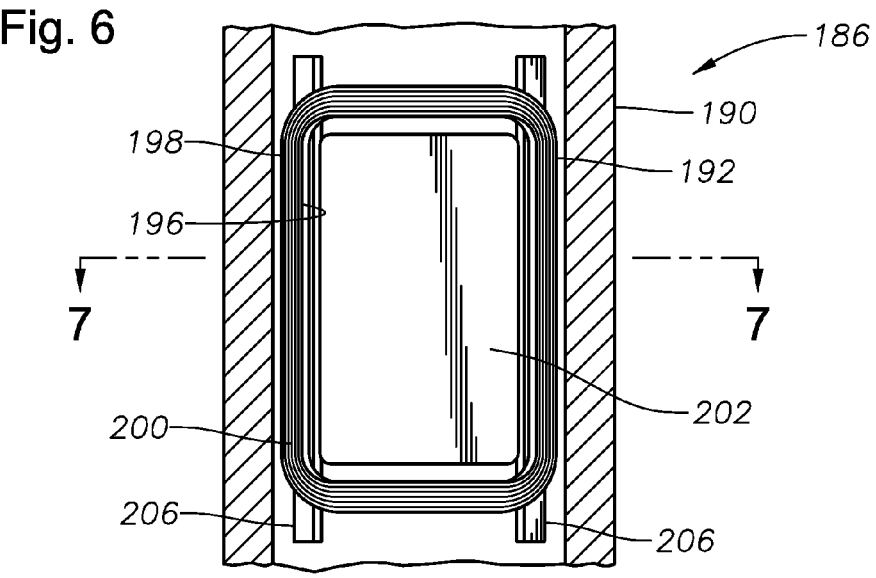
FIG. 6 is a side view of a coil of the magneto drive of FIG. 4, shown from the 6-6 line.

Referring to FIGS. 4 and 5, saddle magneto drive 184 may be an alternative embodiment for propelling electrohydrodynamic drilling mud 124 through riser 102 (FIG. 1). Saddle magneto drive 184 includes a saddle coil 186 for generating magnetic field 188. When viewed from the side, saddle coil 186 may have a generally rectangular shape with rounded corners, as shown in FIG. 6. In some embodiments (not shown), saddle coil 186 may have a different shape, such as oval or elliptical. When viewed from above, the profile of saddle coil 186 may be generally curved or arc-shaped, as shown in FIGS. 5 and 7, thus allowing the overall rectangular body to generally match the contour of riser 190. Each saddle coil is substantially located on one side or one hemisphere of riser 190 such that each saddle coil does not radially traverse more than 180 degrees of the circumference of riser 190. A pair of saddle coils 186 may be located within the bore of riser 190, or may be located such that saddle coils 186 and core 202 form a portion of the sidewall of riser 190. Saddle coils 186 may be placed opposite of each other with a radial gap located between them.

Referring to FIGS. 6 and 7, saddle coil 186 has a perimeter defined by a three sided tray 192. The three sides of tray 192, which form a u-shaped tray, are the bottom 194, inner edge 196, and outer edge 198. As best shown in FIG. 7, bottom 194, faces the interior of riser 190; inner edge 196, faces the interior space of saddle coil 186; and outer edge 198 faces away from the interior space of saddle coil 186, thus defining the perimeter edge of saddle coil 186. Coil windings 200 may be a single conductive wire that is placed in tray 192 and repeatedly looped or wound around the rectangular shape of saddle coil 186, in tray 192. An insulative sheath, such as varnish, may cover coil windings 200 to prevent each turn of the coil from shorting out against an adjacent turn of the coil. The "racetrack" or "saddle" shape of saddle coil 186 may generate magnetic field 188 as a transverse magnetic field, wherein the magnetic field lines are perpendicular to the long dimension of the magnet and thus perpendicular to the axis of riser 190.

Connectors 201 may be used to conduct electricity from a cable (not shown) on the exterior of riser 190 to coil windings 200. As with power connector 180, cables may be attached to power connectors 201 by a remotely operated vehicle (not shown). When energized, coil windings 200 generate magnetic field 188. In a preferred embodiment, DC electricity is used to energize coil windings 200.

As best shown in FIG. 6, the interior portion of saddle coil 186, defined by inner edge 196, may be filled with core 202. Core 202 may be a generally smooth plate made of iron or some other conductive material having a contoured shape to generally match the profile of riser 190. Core 202 and tray 192 may be formed of a unitary piece of material or core 202 may be a separate piece that is welded or otherwise connected to tray 192 along bottom 194 or inner edge 196. As best shown in FIG. 5, in some embodiments, the inner diameter of core 202 is less than the inner diameter of saddle tray 192, such that core 202 protrudes into the bore of riser 190 a greater distance than tray 192. In this embodiment, the inner diameter of core 202 may be generally the same as the inner diameter of electrodes 206. A pair of saddle coils 186 may be located along the side wall of riser 190.

Referring to FIGS. 4 and 5, and as indicated above, saddle magneto drive 184 may also include electrodes 206. Electrodes 206 may be a pair of conductive surfaces that are substantially located between saddle coils 186, each electrode having an axial length that is slightly longer than the axial length of saddle coil 186 (best shown in FIG. 4). As shown in FIG. 5, each electrode 206 may have an arc-shaped profile when viewed from above, wherein electrode 206 lines a portion of the inner diameter of riser 190. Electrodes 206 may be copper or any other conductive material. Connectors 208 may be used to pass electricity from a cable (not shown) to electrodes 206. Preferably, DC is connected to electrodes 206. A positive current may be connected to one electrode 206 and a negative current to the opposing electrode 206, thus establishing an anode and cathode. An insulated spacer (not shown) may be located between each electrode 206 and any adjacent conductive components, such as riser 190 or saddle coil 186, to prevent electrodes 206 from conducting electricity to the adjacent conductive components.

Sealer 210 may be used to seal and protect components of saddle coil 186. Preferably, sealer 210 is a non-conductive, generally water resistant material such as, for example, rubber. Sealer 210 may enclose tray 192 and thus serve to seal coil windings 200. Sealer 210 may also seal and protect surfaces of core 202 and portions of electrodes 206.

To operate saddle magneto drive 184, electricity is passed through connectors 201 to coil windings 200 of saddle coil 186 while drilling mud 124 is located in riser 190. Coil windings 200 generate magnetic field 188. At the same time, electricity is passed through connectors 208 to energize electrodes 206. Electric current passes from the positively charged electrode 206, through drilling mud 124, to the negatively charged electrode 206. In one embodiment, the electric current passes through drilling mud 124 at a 90 degree angle to the magnetic field. Magnetic field 188 propels the electrically charged drilling mud through riser 190.

Figure 8:
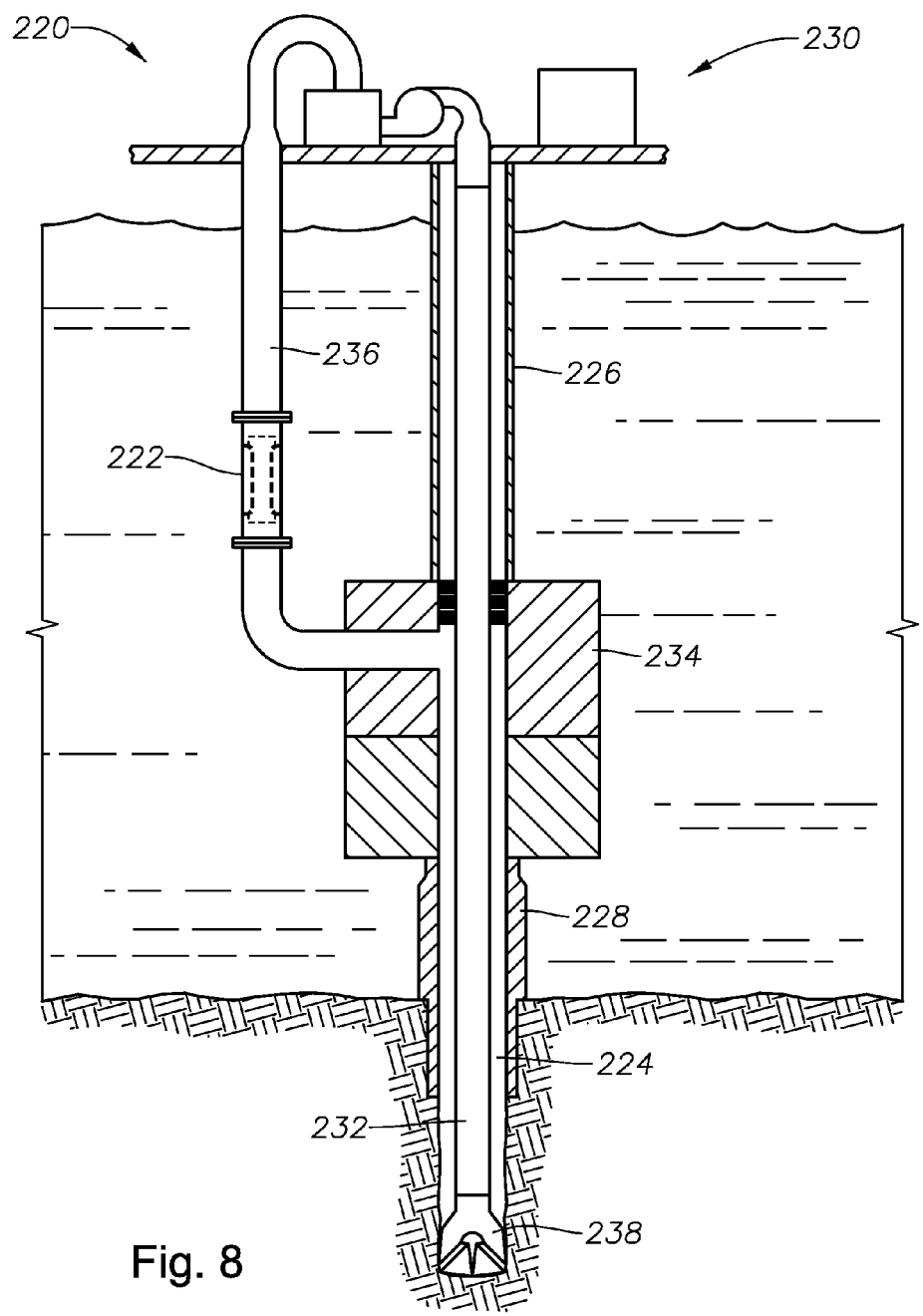
FIG. 8 is a partial sectional view of an exemplary embodiment of a magneto drive used in a separate mud return line of a dual gradient drilling application.

Referring to FIG. 8, magneto drives may be used for propelling drilling mud in any type of riser or wellbore application, including, for example, a dual-gradient drilling ("DGD") system 220. FIG. 8 shows in exemplary embodiment of a DGD system 220 wherein magneto drive 222 is used for drilling subsea wellbore 224. Riser 226 extends from subsea wellhead housing 228 to drilling rig 230. Drill string 232 descends through riser 226 to wellbore 224. Blow-out preventer ("BOP") 234 is a rotating BOP that diverts upward-flowing drilling mud to mud-return line 236. One or more magneto drives 222, such as, for example, saddle magneto drive 184 or magneto drive 130, may be located along mud-return line 236.

In operation, drilling mud is pumped downward through drill string 232 and is used to lubricate drill bit 238. The drilling mud rises back up through wellbore 224 and passes upward through wellhead housing 228 to BOP 234. BOP 234 diverts the drilling mud to mud-return line 236. Magneto drive 222 is energized and propels drilling mud upward through mud-return line 236 to drilling rig 230. Magneto drive 222 may be used in addition to or in lieu of conventional pumping techniques.

Figures 9, 10:
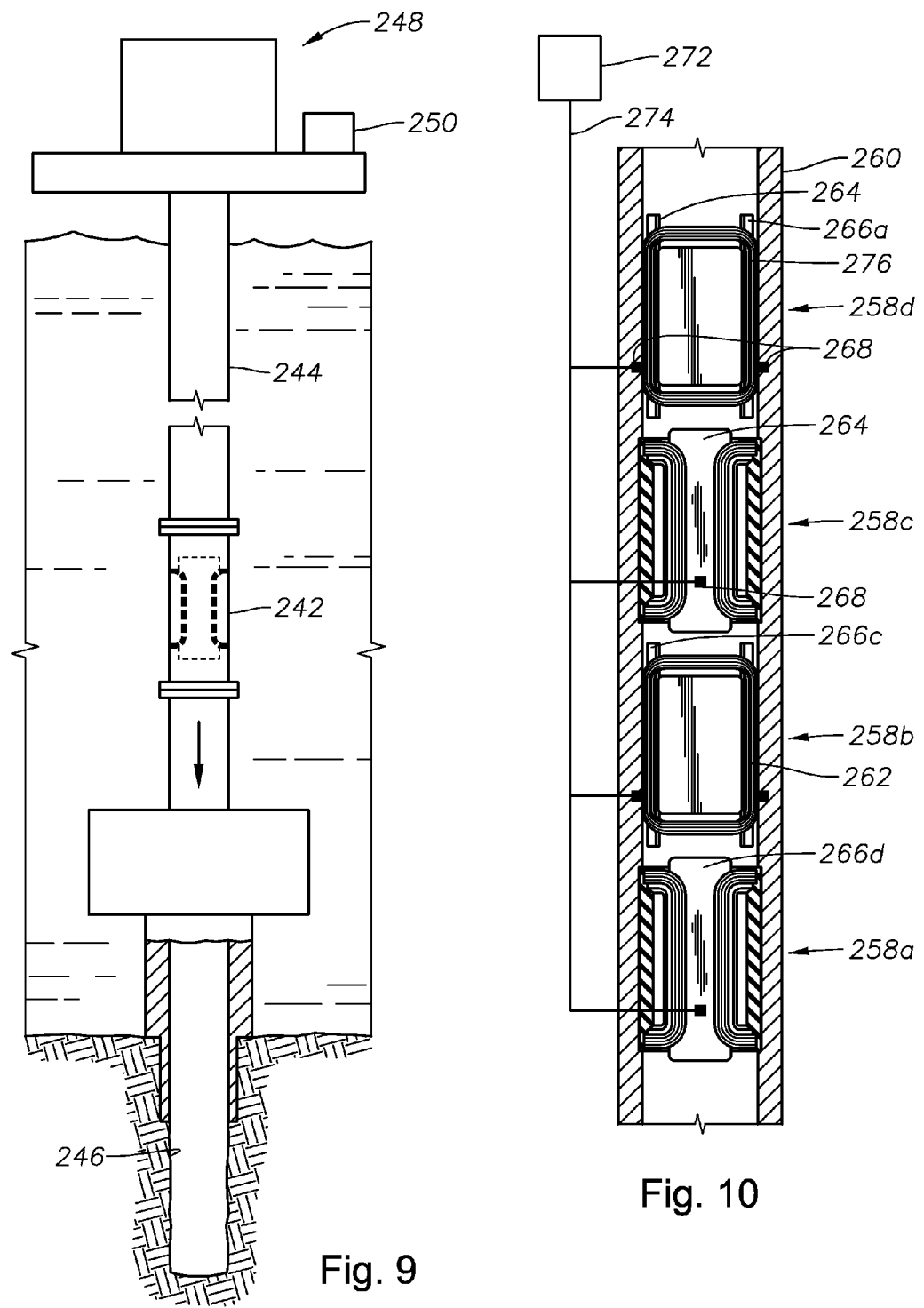
FIG. 9 is a partial sectional view of an exemplary embodiment of a magneto drive used to urge fluid toward a wellbore.
FIG. 10 is a partial sectional view of an exemplary embodiment having multiple magneto drives.

Referring to FIG. 9, magneto drive 242 can be used to propel mud downward through riser 244, toward wellbore 246, as well as upward from drill bit 238 (FIG. 8) toward drilling rig 248. Such reversed flow can be used, for example, to propel drilling mud into a wellbore for the purpose of reducing the flow of fluids coming out of the wellbore.

As described above, saddle coil 186 can generate a magnetic field while electrodes 206 pass electric current through the mud at 90 degrees to the magnetic field. To propel mud downward, magneto drive 242 can create a magnetic field having a vector that is opposite the vector used to propel mud upward. In one embodiment, power source 250 can supply power to saddle coils 186 via a power cable (not shown) to power connector 201 (FIG. 4) of saddle coil 186 and to connector 208 of electrodes 206. Power source 250 can reverse polarity of the electricity applied to saddle coils 186, thus causing the vector of the magnetic field to move down. In one embodiment, power supply can reverse the flow of electricity from electrodes 206 through the drilling mud.

Referring to FIG. 10, in one embodiment, a plurality of magneto drives 258 can be used to propel drilling mud. For example, magneto drives 258a, 258b, 258c, and 258d can be located on a single riser 260 and in close proximity to one another. Indeed, each of the magneto drives 258 can be connected to the adjacent magneto drive or drives 258. In one embodiment, each magneto drives 258 can be rotated a different angle than adjacent magneto drives 258. For example, magneto drive 258b is rotated 90 degrees relative to magneto drive 258a, such that coils 262 of magneto drive 258b are axially centered over the electrodes 264, 266 of magneto drive 258a. Similarly, magneto drive 258c is rotated 90 degrees relative to magneto drive 258b, and magneto drive 258d is rotated 90 degrees relative to magneto drive 258c. While this example shows each drive 258 rotated by 90 degrees, other rotational offsets may be used. For example, a drive 258 may be rotated 33°, 45°, 66°, or any other angle relative to an adjacent drive 258.

In one embodiment, each positively charged electrode is rotationally offset from the preceding by approximately the same amount. For example, drive 258a can have the positive electrode at the 3:00 position, drive 258b can have the positive electrode at the 12:00 position, drive 258c can have the drive at the 9:00 position, and drive 258d can have the drive at the 6:00 position.

Each electrode 264, 266 can have connector 268 for connecting to power supply 272 to magneto drives 258a-d via cable 274 (some connections between cable 274 and connectors 268 are not shown in FIG. 10). In one embodiment, power supply 272 can selectively supply power to each magneto drive 258a-d. For example, power supply 272 can first supply power to magneto drive 258a to propel drilling mud upward through drive 258a, then terminate power to drive 258a as it starts supplying power to drive 258b. Power supply 266 can similarly apply power to successive magneto drive 258c, 258d as it terminates power to each preceding drive. The sequential power application can, thus, propel drilling mud through the series of magneto drives 258. In this embodiment, each drive 258 develops a magnetic field with a vector that moves the drilling mud toward the next magneto drive to receive power. Power can be selectively applied to electromagnets 276 in the same manner as power is applied to electrodes 264, 266.

The progression can be from drive 258a to drive 258d, as described above, or power supply 266 can provide power to the same drives 258, but in a different sequence, such as from drive 258d, then to 258c, then to 258b, and then to 258a, to propel drilling mud in the opposite direction. In the latter application, the magnetic field vector can be opposite what it would be when the progression is from drive 258a to drive 258d. Any number of magneto drives 258 can be combined to operate in succession. In one embodiment, power can be applied to more than one magneto drive 258 at a time. For example, power supply 266 could provide power to drives 258a and 258c, and then provide power to drives 258b and 258d.

While the invention has been shown or described in only some of its forms, it should be apparent to those skilled in the art that it is not so limited, but is susceptible to various changes without departing from the scope of the invention.

What is claimed is:

1. An apparatus for pumping a well drilling electrohydrodynamic (EHD) fluid through a riser conduit extending from a sea floor to a drilling platform, the apparatus comprising:
   a tubular segment having external flanges at upper and lower ends adapted to be secured into the riser conduit, the tubular segment having a central bore, through which the EHD fluid is adapted to flow;
   at least one coil mounted to the tubular segment and adapted to generate an electromagnetic field when electricity is passed through the coil, wherein at least a portion of the electromagnetic field is located within the central bore of the tubular segment;
   an anode and a cathode mounted to the bore of the tubular segment for applying a voltage potential to the EHD fluid flowing through the bore; and
   a power supply with a first power cable providing a first electric current to the anode and the cathode through the first power cable.

2. The apparatus according to claim 1, wherein the first electric current is switchable between at least a first polarity and a second polarity.

3. The apparatus according to claim 1, wherein the power supply further comprises a second power cable and the power supply simultaneously provides a second electric current to the coil through the second power cable, the second electric current being switchable between at least a first polarity and a second polarity.

4. The apparatus according to claim 1, wherein the coil comprises a windings and a portion of the windings extend around a portion of the circumference of the tubular segment and wherein the windings are equidistant from an axis of the tubular segment.

5. The apparatus according to claim 1, further comprising at least a second coil, wherein each coil radially traverses less than 180 degrees of a circumference of the tubular segment.

6. The apparatus according to claim 1, wherein each of the external flanges have bolt holes for bolting the tubular segment into the riser conduit.

7. An offshore well drilling system comprising:
   a drilling fluid return conduit having a lower end adapted to be coupled to a subsea wellhead and an upper end at a drilling platform;
   a well drilling fluid having electrohydrodynamic (EHD) properties:
   a drilling fluid pump on the drilling platform for pumping the well drilling fluid down a drill string into the well and causing the drilling fluid to flow back up the well and into the drilling fluid return conduit;
   a plurality of tubular segments connected into the return conduit and axially spaced along the return conduit, the tubular segments comprising:
   a central passage through which EHD fluid is adapted to flow;
   a cathode forming a portion of an inner diameter surface of the central passage;
   an anode, spaced circumferentially from the cathode, and forming a portion of an inner diameter surface of the central passage for applying a voltage potential to the EHD fluid flowing through the passage; and
   an electrical coil located on the portion of the central passage containing the cathode and anode, wherein the coil is adapted to generate a magnetic field within the passage when electricity is applied to the coil.

8. The apparatus according to claim 7, wherein the system further comprises a power supply and wherein the power supply sequentially supplies power to each of the tubular segments.

9. The apparatus according to claim 7, wherein the tubular segments are in communication with a wellbore within the well, and wherein providing electricity to the tubular segments urges the EHD fluid toward the wellbore.

10. The apparatus according to claim 7, wherein the coil comprises turns of wire forming a saddle on the exterior of the central passage, and wherein the saddle does not radially traverse more than 180 degrees of the circumference of the central passage.

11. The apparatus according to claim 7, wherein the magnetic field is perpendicular to an axis of the tubular segment.

12. The apparatus according to claim 7, wherein the cathode and anode have circumferential mid points, and the mid point of the cathode is 180 degrees from the midpoint of the anode.

13. The apparatus according to claim 7, cathode and the anode are partially cylindrical, adapted to be in contacted with the EHD fluid, and located on opposite sides of the bore.

14. The apparatus according to claim 7, wherein the EHD fluid has a pH between about 10 and 11.

15. A method for drilling a subsea well, the method comprising:
- (a) extending a riser conduit from a drilling platform to a sea floor;
- (b) providing a magneto drive unit on a tubular member, the magneto drive unit having a central passage, a coil, a cathode, and an anode, and mounting the tubular member in the riser conduit;
- (c) flowing a well drilling fluid with electrohydrodynamic (EHD) properties down a drill pipe string and into the well and flowing the well drilling fluid back up the well into the tubular member;
- (d) creating a magnetic field in the central passage, the magnetic field being applied to the EHD fluid; and
- (e) applying a voltage potential to the EHD fluid flowing through the electromagnetic field, thereby applying a motive force to the EHD fluid.

16. The method of claim 15, wherein steps (d) and (e) comprise urging the EHD fluid toward the wellbore.

17. The method of claim 15, wherein steps (d) and (e) comprise urging the EHD fluid away from the wellbore.

18. The method of claim 15, further comprising at least a second magneto drive unit and a power supply connected to the anodes and the cathodes, wherein the central passages of the magneto drives are axially aligned and the anodes and cathodes of at least two of the magneto drives are not axially aligned.

19. The method of claim 15, further comprising providing a power supply connected to the anode and the cathode, wherein the power supply can switch the polarity of the electricity.

20. The method of claim 18, wherein the power supply can selectively supply power to each of the magneto drives.

* * * * *